(12) United States Patent
Loewen et al.

(10) Patent No.: US 10,770,191 B2
(45) Date of Patent: Sep. 8, 2020

(54) SYSTEMS AND METHODS FOR REDUCING SURFACE DEPOSITION AND CONTAMINATION

(71) Applicant: GE-Hitachi Nuclear Energy Americas LLC, Wilmington, NC (US)

(72) Inventors: Eric P. Loewen, Wilmington, NC (US); Brett J. Dooies, Wilmington, NC (US); Nicholas F. O'Neill, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1629 days.

(21) Appl. No.: 14/266,302

(22) Filed: Apr. 30, 2014

(65) Prior Publication Data
US 2015/0318063 A1    Nov. 5, 2015

(51) Int. Cl.
*B08B 3/04*    (2006.01)
*G21C 15/25*    (2006.01)
(Continued)

(52) U.S. Cl.
CPC .............. *G21C 17/013* (2013.01); *B08B 3/04* (2013.01); *B08B 3/14* (2013.01); *G21C 15/25* (2013.01);
(Continued)

(58) Field of Classification Search
CPC .. B08B 3/04; B08B 3/14; G21C 15/25; G21C 17/013; G21C 19/207; G21C 19/307;
(Continued)

(56) References Cited

U.S. PATENT DOCUMENTS 3,764,553 A    10/1973 Kirby
4,436,694 A    3/1984 Vassalotti et al.
(Continued)

FOREIGN PATENT DOCUMENTS

CN    202500737 U    10/2012
JP    08141534 A  *  6/1996
(Continued)

OTHER PUBLICATIONS

European Search Report and Opinion issued in connection with corresponding EP Application No. 15165798.8 dated Sep. 18, 2015.
(Continued)

*Primary Examiner* — Alexander Markoff
(74) *Attorney, Agent, or Firm* — Ryan Alley IP (57) ABSTRACT

Mobile apparatuses move within contaminated fluid to create fluid flows against structures that remove and prevent contaminant deposition on structure surfaces immersed in the fluid. Unsettling flows in water may exceed approximately 2 m/s for radionuclide particles and solutes found in nuclear power plants. Mobile apparatuses include pressurized liquid from a pump or pressurized source that can be chemically and thermally treated to maximize deposition removal. When spraying the pressurized liquid to create the deposition-removing flow, mobile apparatuses may be self-propelled within the fluid about an entire surface to be cleaned. Mobile apparatuses include filters keyed to remove the contaminants moved into the coolant by the flow, and by taking in ambient fluid, enable such filtering of the ambient fluid along with a larger flow volume and propulsion. Propulsion and the pressurized liquid in turn enhance intake of ambient fluid.

15 Claims, 5 Drawing Sheets

(51) Int. Cl.
*B08B 3/14* (2006.01)
*G21C 19/307* (2006.01)
*G21C 17/013* (2006.01)
*G21F 9/04* (2006.01)
*G21F 9/12* (2006.01)
*G21C 17/022* (2006.01)
*G21F 9/00* (2006.01)
*G21C 19/20* (2006.01)

(52) U.S. Cl.
CPC ....... *G21C 17/0225* (2013.01); *G21C 19/207* (2013.01); *G21C 19/307* (2013.01); *G21F 9/002* (2013.01); *G21F 9/04* (2013.01); *G21F 9/12* (2013.01)

(58) Field of Classification Search
CPC ....... G21C 17/0225; G21F 9/12; G21F 9/002; G21F 9/04
See application file for complete search history.

(56) References Cited

U.S. PATENT DOCUMENTS

| | | | |
|---|---|---|---|
| 5,025,523 A | 6/1991 | Zappa et al. | |
| 5,460,723 A | 10/1995 | Bourbigot et al. | |
| 5,553,106 A * | 9/1996 | Enomoto | C21D 7/06 |
| | | | 134/108 |
| 5,625,658 A | 4/1997 | Lin | |
| 5,764,717 A * | 6/1998 | Rootham | C02F 5/12 |
| | | | 134/1 |
| 5,896,433 A | 4/1999 | Kelen | |
| 2004/0011136 A1 | 1/2004 | Berman | |
| 2007/0127619 A1 | 6/2007 | Hosokawa et al. | |
| 2009/0101586 A1 * | 4/2009 | Brings | G21F 9/04 |
| | | | 210/682 |
| 2009/0151750 A1 * | 6/2009 | Ecker | A47L 15/0047 |
| | | | 134/18 |
| 2009/0218289 A1 * | 9/2009 | Brings | G21C 19/46 |
| | | | 210/682 |
| 2010/0296618 A1 | 11/2010 | Sejvar | |
| 2013/0022686 A1 * | 1/2013 | Rademan | C02F 1/64 |
| | | | 424/600 |
| 2013/0170601 A1 | 7/2013 | Varrin et al. | |

FOREIGN PATENT DOCUMENTS

| | | | |
|---|---|---|---|
| JP | 09127286 A | * | 5/1997 |
| JP | 11188327 A | * | 7/1999 |
| JP | 2002116295 A | | 4/2002 |
| JP | 2007198839 A | | 8/2007 |

OTHER PUBLICATIONS

Poirier, "Minimum Velocity Required to Transport Solid Particles from the 2H-Evaporator to the Tank Farm," US DoE Technical Report WSRC-TR-2000-00263, Sep. 27, 2000.
Dow Water & Process Solutions, Ion Exchange Resins, accessed from http://www.dowwaterandprocess.com/en/products/ion_exchange_resins on Apr. 30, 2014.
Tri Nuclear Corp. UF-1000 Information, accessed from http://trinuclear.com/index_files/Page5015.htm on Apr. 30, 2014.

* cited by examiner

SYSTEMS AND METHODS FOR REDUCING SURFACE DEPOSITION AND CONTAMINATION

BACKGROUND

Figure 1:
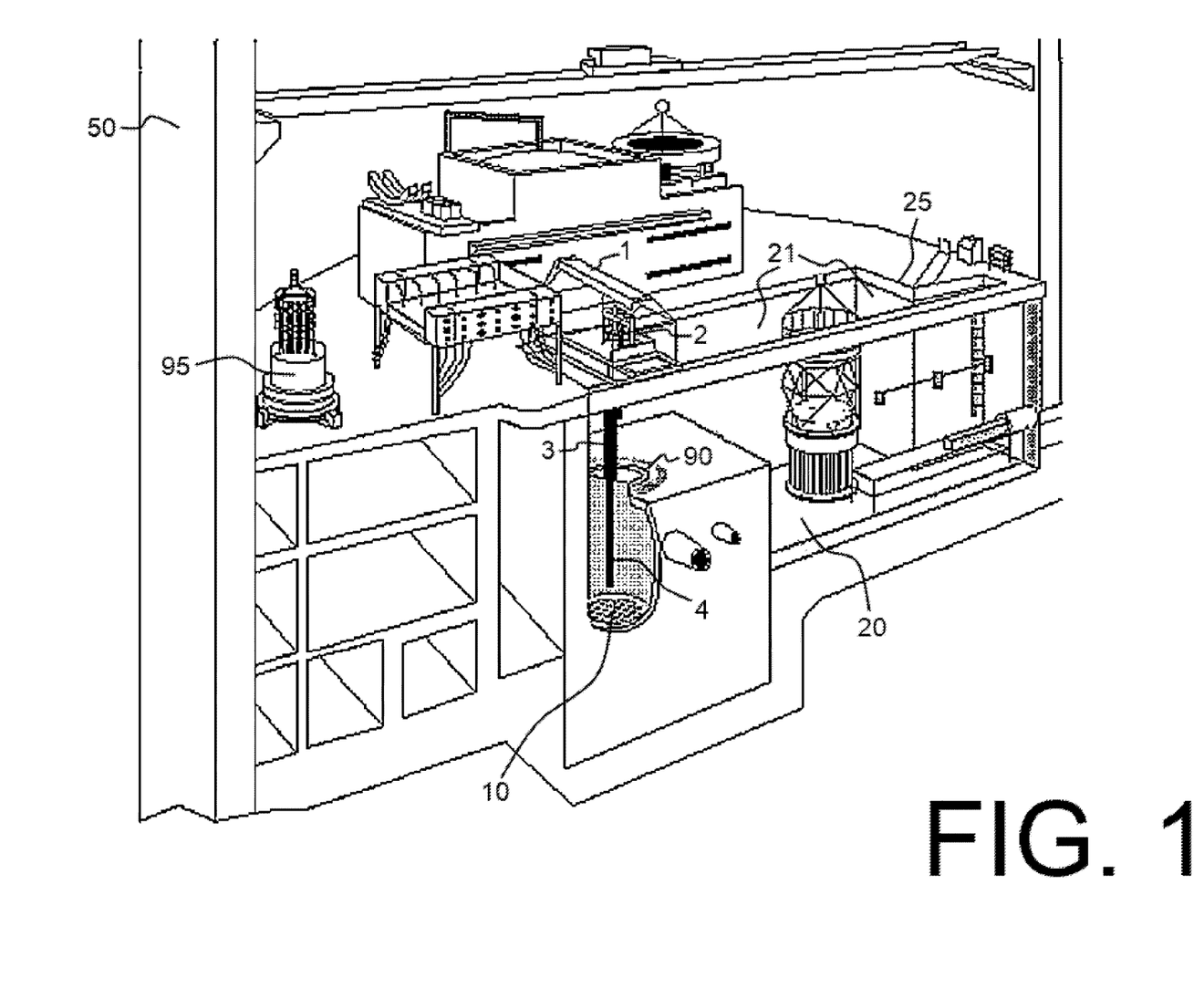
FIG. 1 is an illustration of a related art nuclear reactor containment structure interior with refueling cavity.

As shown in FIG. 1, a nuclear power station conventionally includes a reactor pressure vessel 10 sealed within a containment structure 50 that houses several power-producing systems and equipment. Reactor 10 may include various configurations of fuel and reactor internals for producing nuclear power. For example, vessel 10 may include several fuel assemblies positioned within a general cylindrical core. Fluid coolant and/or moderator may flow through reactor 10; for example, in US light water reactors, the fluid may be purified water, in natural uranium reactors, the fluid may be purified heavy water, and in gas-cooled reactors, the fluid coolant may be a gas such as helium, with moderation provided by other structures.

Vessel 10 may be sealed and opened through upper head 95 at flange 90. As shown in FIG. 1, during plant fabrication and at regular service and/or refueling outages, upper head 95 may be removed and operators and/or equipment can access internals of vessel 10 inside of containment structure 50 for various purposes. For example, with access to the reactor internals, some of fuel bundle assemblies may be replaced and/or moved between within the core and a fuel staging or spent fuel pool area(s), and maintenance/installation on other reactor structures in containment 50 may be performed.

During such maintenance, a refueling cavity 20 above flange 90 and surrounding reactor 10 may be filled, or flooded, with fluid coolant. The fluid coolant may both remove heat and block radiation from escaping to operators around cavity 20, such as workers performing maintenance on operations floor 25 above cavity 20. With such shielding, refueling cavity 20 may be used for storage of radioactive structures and a staging area for fuel handling, as well as a general interface for access into reactor 10.

Refueling bridge 1 with mast 3 and grapple 4 are useable during outages with access to reactor vessel 10 to perform fuel offloading, reloading, shuffling, and/or maintenance. Refueling bridge 1 may be positioned on operations floor 25 above or about flange 90 when reactor vessel 10 is opened. Bridge 1 may include a trolley 2 capable of rotating and/or laterally moving to any horizontal or vertical position. Trolley 2 may include a refueling mast 3 with hoist box and grapple 4 that descend into reactor 10 and perform fuel and other structure movements throughout cavity 20 during outages.

At other outage periods and during operations, cavity 20 may be drained completely or partially (such as down to flange 90). Because cavity 20 may have previously been flooded with fluid coolant before such draining, residues from and particulates in the fluid coolant may adhere to cavity surfaces, including cavity walls 21. These remnants from the fluid may be undesirable—such as radioactive or chemically corrosive—for operating conditions within cavity 20, on operations floor 25, and/or anywhere throughout containment building 50. As such, operators sometimes take measures to reduce particulates and impurities in any fluid that fills cavity 20. For example, plant operators may add solvents or otherwise change coolant chemistry to reduce deposition on surfaces drained of coolant and/or may use submersible, stationary filters on a floor of cavity 20. For example, underwater filters from Tri Nuclear Corporation may sit on a bottom of cavity 20 and filter or demineralize fluid in cavity 20.

SUMMARY

Example embodiments and methods reduce settling of unwanted materials out of a fluid onto structures by causing a flow around the structures. Example embodiments use a fluid source and discharge the fluid from the source against the structure in the fluid. The discharged fluid flow and ambient fluid surrounding the structure may be the same or different. For example, both fluids may be water, but the ambient fluid may have unwanted particulate or dissolved contaminates in it, whereas the sprayed fluid might be filtered and/or chemically treated to help remove the unwanted materials from the structures. Example embodiments and methods may use a flow rate of approximately 2 meters per second or more, which is effective in several types of water to prevent deposition out of the water onto surfaces. The flow rate may be created by a pressurized fluid source and/or a local pump, and the jetted fluid may come from the same volume surrounding the structure, but with optional filtering, temperature adjustment, and/or chemical treatment, for all or a portion of the fluid jet.

Example embodiments may be wholly submerged in the fluid and still operate, using the flow discharge to move in the fluid to spray different desired surfaces, as well as other movement methods like changing buoyancy. Example embodiment systems may also work with portions in the fluid and other portions outside the fluid. For example, a multi-stage filter may be fitted inside a mobile assembly and submerged in coolant water in a flooded cavity, where the water is passed through the filter and dispersed to create the 2 m/s rate by an induction pump. Alternatively or additionally, another filter and pump may suck the water coolant from the cavity and feed it through a base outside the cavity where the water is treated chemically and thermally and delivered back into the cavity to be sprayed at deposition surfaces. With proper buoyancy, sizing, and spray discharge, any submerged mobile assembly may move between or to desired surfaces to be cleaned.

Multi-stage filters useable with example embodiments may remove a variety of contaminants, including metallic conjugates specifically liberated by the water chemistry of the flow. Example embodiment filters may include coarse reservoirs, fibrous filters, charged particles, sintered metallics, resins, etc. in several different stages that are independently removable and disposable.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The inventors have recognized that existing coolant cleanup in nuclear power facilities, focusing on ion removal from reactor coolant with stationary scrubbers in a flooded cavity and/or through existing coolant clean-up filters, resins, and deionizers in combination with adjusting coolant chemical properties to decrease particulate deposition, does not fully remove complexed metal ions present as particulates in reactor coolant. This is especially problematic with metallic radioisotopes like Cobalt, Cesium (particularly in the case of a fuel rod leak), and Zinc, which readily complex with Iron to form particulates that deposit on flooded surfaces and cannot be effectively removed with conventional mechanical and chemical remediation measures. These radioisotopes deposited on flooded surfaces generally remain over time and can become airborne upon dry-out, presenting a significant radiation dose contribution to personnel and equipment in the areas during and after flooding, as well as serving as a reservoir for future coolant contamination when disturbed from the surfaces by re-flooding.

The inventors have recognized that radioactive, complexed metallic particulates that have deposited on plant surfaces during contact with coolant may be removed through fluid-mechanical action. On deposition surfaces, particulates are generally not exposed to higher fluid flows because of the nature of the boundary layer adjacent to a stationary surface formed in a reactor coolant like water. However, by causing fluid flows of sufficient velocity, the metallic particulates can be removed from the surface and prevented from re-depositing on the surface. Thus, by moving coolant at a sufficient transport velocity at deposition surfaces, metallic particulates may be kept in the coolant where they can be removed through conventional scrubbing and/or additional filtering, preventing them from depositing and increasing radiation exposure.

In order to discover the necessary transport velocity to avoid the newly-recognized fluid-dynamic solution to radio-isotope deposition, the inventors looked to Poirier, "Minimum Velocity Required to Transport Solid Particles from the 2H-Evaporator to the Tank Farm" US DoE Technical Report WSRC-TR-2000-00263, Sep. 27, 2000, incorporated by reference herein in its entirety, as a reference for particulate transport velocities in closed systems. Repurposing the transport and settling velocity calculations from the Poirier report for open systems with the density characteristics of Cobalt particulates and using typical diameters of such particulates to derive Reynolds numbers in the solutions, the inventors discovered that a flow rate of about 2 meters per second inhibited deposition of particulates up to 5 millimeters in diameter. This rate is well below the expected necessary rate for particulate transport speed, especially in light of its use in an open system and compared to the velocities in the Poirier report.

The inventors further recognized that movement of fluid at speeds well below 2 m/s at deposition surfaces results in high levels of settling of radioactive particulates. The below disclosure uniquely overcomes these and other problems, by leveraging systems and methods that move particulate-bearing fluid at calculated speeds near or above 2 m/s, sufficient to prevent settling of radioactive contaminants on these surfaces.

The present invention is systems and methods of reducing and/or preventing unwanted depositions on surfaces by creating fluid flows on those surfaces above a settling velocity of the unwanted substances. In contrast to the present invention, the few example embodiments and example methods discussed below illustrate just a subset of the variety of different configurations that can be used as and/or in connection with the present invention.

Figure 2:
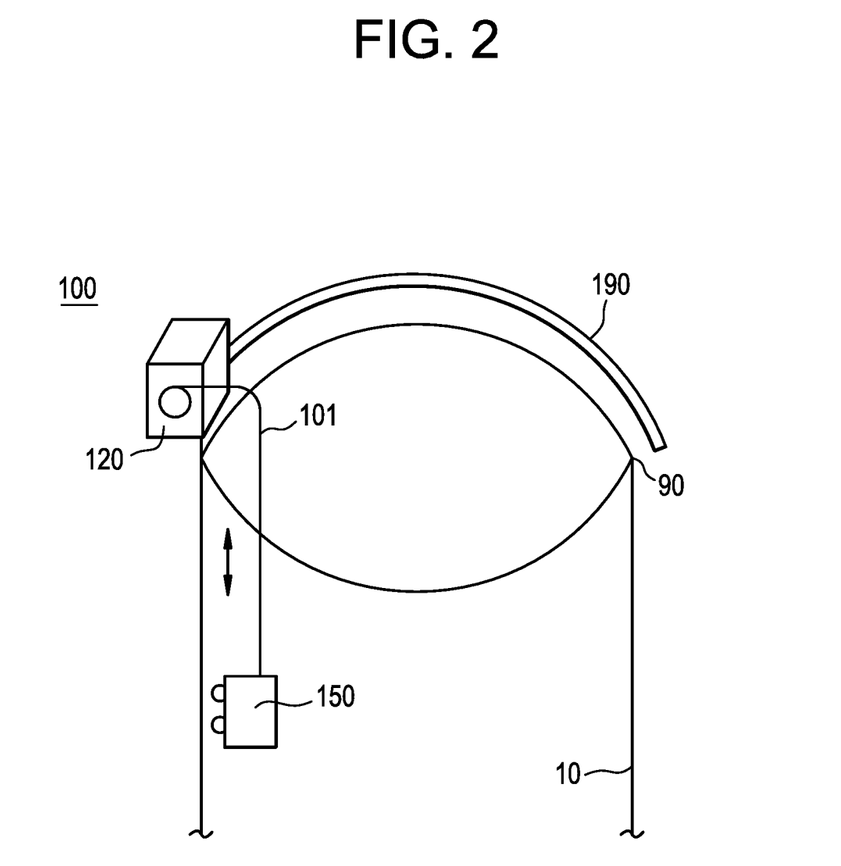
FIG. 2 is an illustration of an example embodiment flow inducer system.

FIG. 2 is an illustration of an example embodiment flow inducer system 100 usable to prevent particulate settling on surfaces in fluid coolant, including preventive radioactive particle deposition on structures immersed in fluids bearing the same. As shown in FIG. 2, system 100 may include a base 120 positioned about or above a reactor 10. For example, inducer system 100 may be positioned about flange 90 of reactor 10 during a maintenance outage in which an upper head of reactor 10 is removed for access to the fuel core and reactor internals. Example embodiment system 100 includes a mobile assembly 150 that can extend down into reactor 10 and into coolant therein, via a connection 101. In this way, example embodiment flow inducer system 100 may include components and/or operations interfaces in base 120, such as electrical power connections, user interfaces, purified coolant sources, external movement structures, etc., that function best outside of coolant, while mobile assembly 150 induces flow in coolant in which it is immersed and remote from base 120. Alternatively, it is understood that base 120 may be combined into mobile assembly 150 to provide a unitary structure for inducing flow and preventing particulate deposition on surfaces exposed to coolant or other particulate contaminant-bearing fluids.

Mobile assembly 150 causes coolant flow of approximately 2 meters per second or more to be directed to desired surfaces. Mobile assembly 150 is moveable within the coolant along surfaces and in spaces containing the same to prevent deposition at several positions. For example, as shown in FIG. 2, mobile assembly 150 may move vertically along connection 101 to reach several different axial positions of a wall of reactor 10. Similarly, mobile assembly 150 may move radially or angularly with proper forces to any other surface at which an induced flow may be desired to reduce deposition. A track 190 or other movement path, such as one provided via crane or other locomotive structures, may be provided about flange 90 to permit angular movement of base 120 as well. Similarly, track 190 could be positioned on an operations floor 25 or other area to provide desired movement and/or positioning of example embodiment flow inducer system 100.

Although example embodiment flow inducer system 100 is shown in FIG. 2 about a reactor 10 at flange 90, it is understood that inducer 100 may be installed at other locations. For example, a base 120 could be positioned on a containment operations floor 25 (FIG. 1), with mobile assembly 150 extending into and moving within a cavity 20 (FIG. 1). Or, for example, system 100 may be used in a spent fuel pool or new fuel staging area within a nuclear power plant. Still further, example embodiment flow inducer system 100 may be used in any system with fluid contamination removable through fluid flow.

Figure 3:
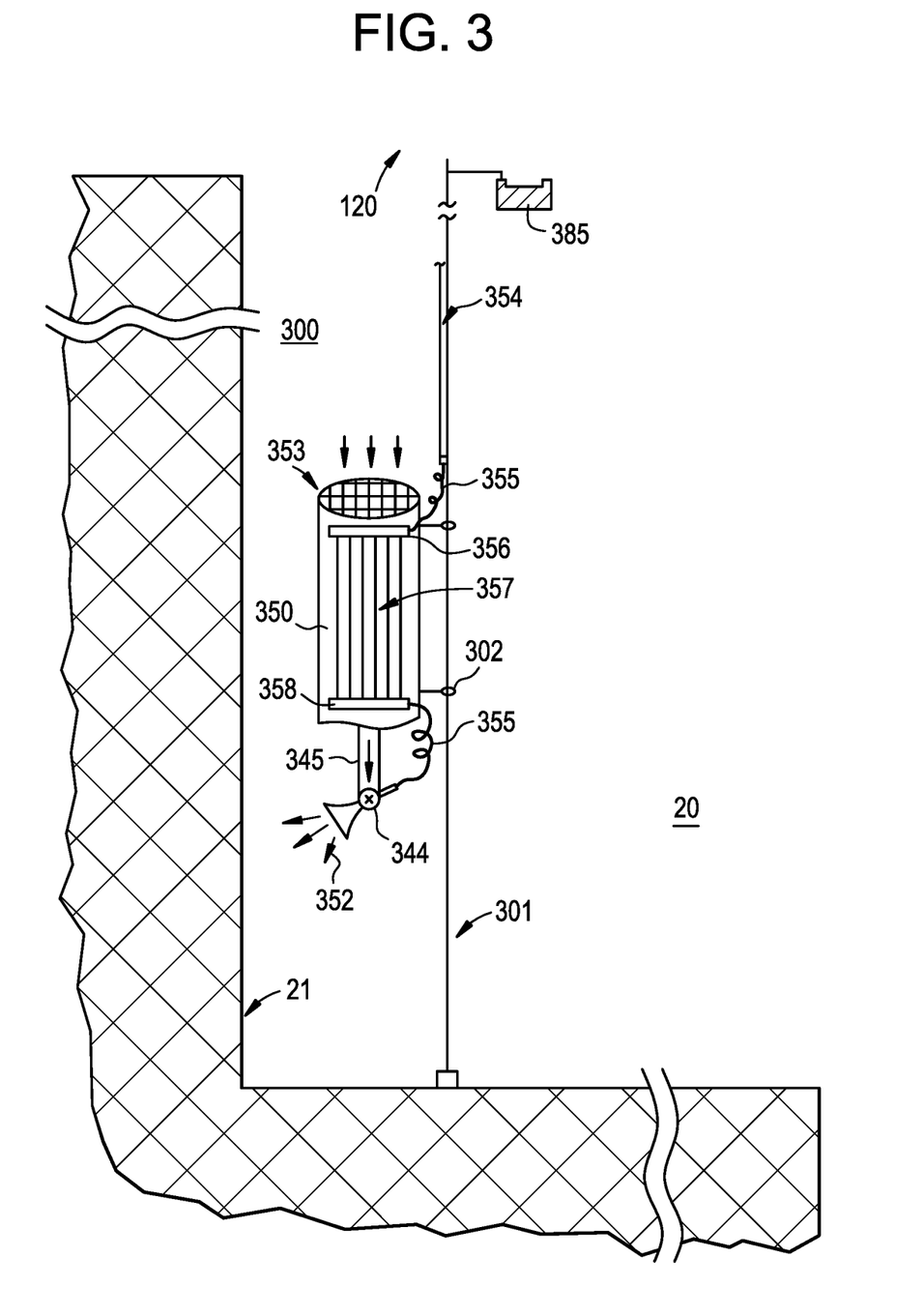
FIG. 3 is an illustration of an example embodiment mobile assembly.
Figure 4:
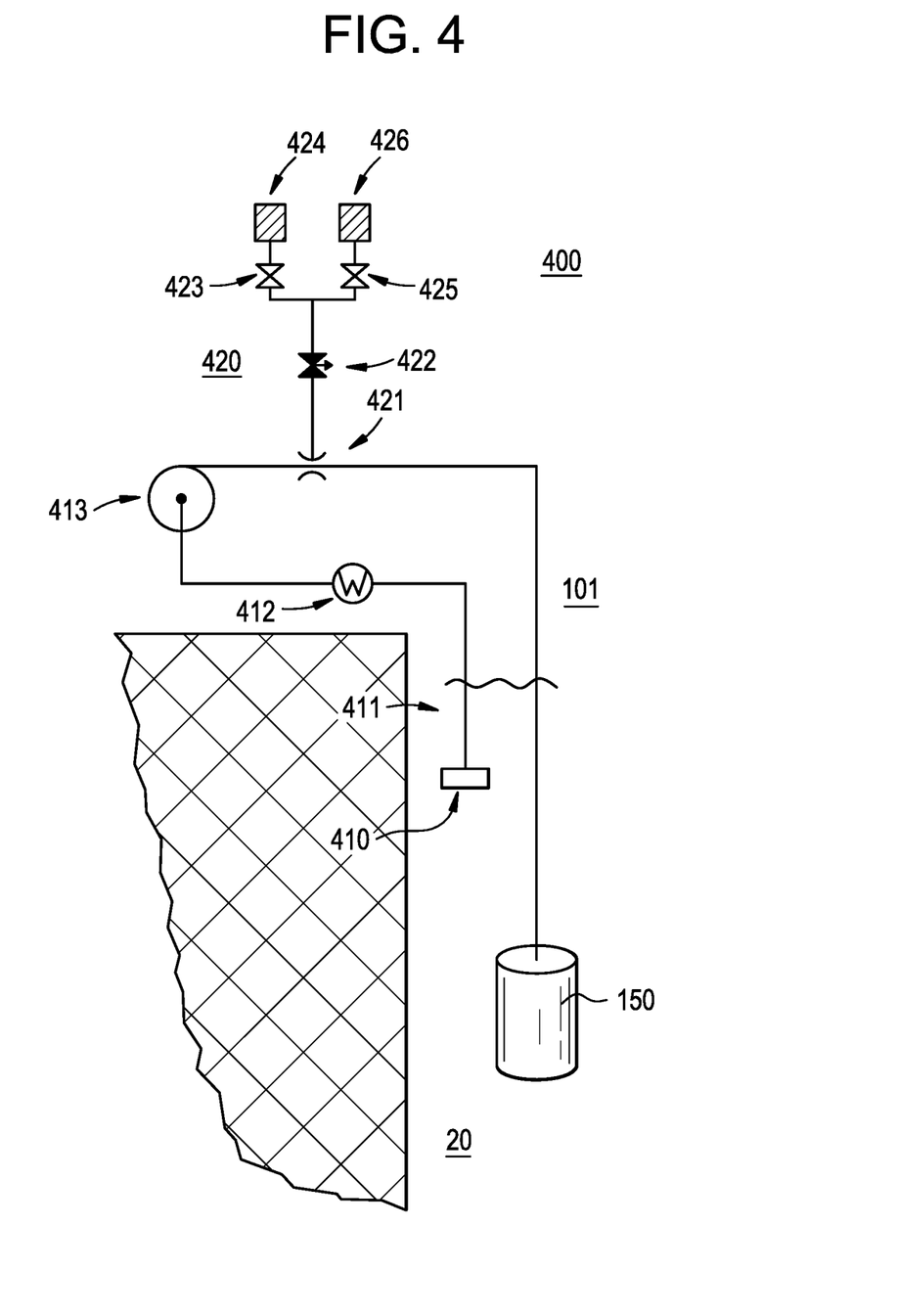
FIG. 4 is an illustration of an example embodiment base.

FIGS. 3 and 4 are illustrations of portions of example embodiment flow inducer systems, with FIG. 3 illustrating in detail an example embodiment mobile assembly and FIG. 4 illustrating in detail an example embodiment base. As such, the components of FIG. 3 could be useable as or with mobile assembly 150 of FIG. 2, and components of FIG. 4 could be useable as or with base 120 of FIG. 2. Or example embodiments of FIGS. 3 and 4 may be used separately or with different systems or combined into a single mobile system, for example.

As shown in FIG. 3, an example embodiment mobile assembly 300 may include a variety of components to create a deposition-reducing coolant flow against several different surfaces in a volume of coolant fluid. Assembly 300 may be connected to a guide or movement arm for positioning. For example, a wire, pole, or removably fixed rod 301 may span an axial depth of a refueling cavity 20 or other space, and example embodiment assembly 300 may connect to rod 301 through a movable connector 302 like a keyhole, loop, or grommet that permits only axial movement of assembly 300 along fixed rod 301. Rod 301 may connect to other components outside of cavity 20, such as a base 120 including coolant supply 354, electrical supply 358, etc., or rod 301 may be used in isolation.

Coolant supply 354 may be coupled with pole 301 or otherwise supplied to mobile assembly 300. Coolant supply 354 may provide additional volume of coolant or other compatible fluid for creating induced flow for removing particulates. For example, if coolant is deionized or borated light water, coolant supply 354 may supply matching water. Coolant supply 354 may also provide relatively cleaner fluid as well as chemically-treated and temperature-moderated fluid for optimal contaminate clean-up. For example, coolant supply 354 may provide relatively colder water treated with a weak acid and/or oxidizer to enhance particulate solubility and removability by filters. Coolant supply 354 may also provide coolant for inducing fluid flow at a higher or operating pressure for example embodiment mobile assembly 300. Coolant supply 354 may feed directly into assembly 300 or connect via a coolant supply connection 355, which may be tubing or an injector, for example.

Example embodiment mobile assembly 300 may also include a pump 344 or other hydrodynamic flow-inducing structure. For example, pump 344 may be an inductive jet pump, a centrifugal pump, a hydraulic pump, etc. Pump 344 may be locally powered through batteries or may be connected to an external, remote power source, such as electrical supply 358 via rod 301. Although pump 344 may be omitted with sufficient pressure and flow shaping from coolant supply 354 to create desired coolant flows, pump 344 may be used with a pressurized coolant supply 354 or without coolant supply 354.

Example embodiment mobile assembly 300 may use fluid provided from coolant supply 354 and/or coolant from cavity 20 to create a flow directed at desired surfaces, such as cavity wall 21. In the example of FIG. 3, assembly 300 uses both provided and ambient coolant fluid in creating a flow 352. For example, lower-temperature coolant from coolant supply 354 may enter an upper manifold 356 and flow down through a series of tubes and/or baffles in a heat exchanger 357. The coolant may flow into a lower collection manifold 358 from the tubes and into a final section of coolant supply connection 355, which may be a flexible tube or injection device. Pump 344 then pressurizes and accelerates the coolant, potentially through a nozzle and/or diffuser, into an induced flow 352 against surfaces 21.

Additionally, ambient coolant from cavity 20 may be taken in through a top inlet 353 and passed through an internal filter 350 around heat exchanger 357. Internal filter 350 may filter out impurities and dislodged/dissolved radionuclide depositions from ambient coolant taken from cavity 20, permitting relatively cleaner induced fluid flows. An example embodiment filter useable as filter 350 is discussed in connection with FIG. 5. If coolant from coolant supply 354 is colder than coolant in cavity 20, natural convection from the lower-temperature coolant in heat exchanger 357 may aid in driving ambient coolant from cavity 20 into inlet 353 and internal filter 350. Ambient coolant, after being filtered through internal filter 350, may connect to pump 344 through an ambient coolant connector 345.

Pump 344 may entrain ambient coolant from ambient coolant connector 345 with any accelerated coolant provided from coolant supply 354 via coolant supply connection 355. With the use of a proper flow path, potentially including a diffuser, accelerated coolant from pump 344 may provide a suction to ambient coolant connector 345, drawing additional ambient coolant into inlet 353 and through filter 350. For example, with proper pump power and flow path, coolant may be drawn from ambient coolant at a 2-to-1 ratio of coolant from coolant supply 354.

Although example embodiment mobile assembly 300 uses both provided coolant and ambient coolant to create a coolant flow with a pump, it is understood that other combinations are useable in example embodiments. For example, only a pressurized coolant source and nozzle may be used to generate a desired coolant flow without a pump or filter. Or, for example, only a locally-powered pump and ambient coolant may be used to create coolant flows without need for external sources. Or, as shown in FIG. 3, all systems may be used together.

Induced coolant flow 352 is ejected or discharged under the force of pump 344 and potentially a nozzle or diffuser at any desired velocity. For example, with proper pump power and/or flow path narrowing, coolant flow 352 may be 2 m/s or greater, resulting in desired deposition preventing and removing discussed above. Coolant flow 352 may be directed at various surfaces desired to be keep free from radionuclide deposition while immersed in coolant, such as cavity wall 21.

Example embodiment mobile assembly 300 may also be moveable, axially or otherwise, due to coolant flow 352. For example, if the coolant is light water in a flow 352 into a flooded cavity 20 of the same, sufficient force may be generated by flow 352 on assembly 300 to move assembly 300 upward along pole 301, even with flow 352 at only a slight downward angle. Flow 352 may be redirected and/or changed in intensity to create desired upward or downward movement of mobile assembly 300 along pole 301, potentially reaching an entire axial length of a surface positioned nearby under only the forces generated by coolant flow 352. Similarly, gravity and buoyancy may be used to selectively move example embodiment mobile assembly 300 in a sufficiently dense coolant like water, alone or in combination with forces from flow 352, as well as other movement structures and forces. Sufficient upward movement axially may also enhance ambient coolant flow into inlet 353 for filtering, if used.

As shown in FIG. 4, an example embodiment base 400 may include a variety of components to treat and provide fluid coolant to, and potentially move and control, a mobile assembly for creating flow. Example embodiment base 400 may be positioned near or above a coolant-filled space to be jetted or exposed to deposition-removing flows by mobile assembly 150, such as refueling cavity 20 for example. Or base 400 may be more distantly located, potentially spread among several different facilities, or a component within mobile assembly 150.

Coolant may be provided to base 400 from any source, including a flooded cavity 20, coolant reserve, plant feedwater, local taps, etc. For example, a suction filter 410 may be immersed in coolant in cavity 20, and coolant may be drawn into base piping 411 through filter 410 by a pump 413. Filter 410 may effectively remove radionuclides in solution or as particulates in coolant. For example, filter 410 may be similar to example embodiment filter 500 discussed in connection with FIG. 5 useable in an example embodiment mobile assembly 300. Piping 411 may be any transport path capable of carrying fluid coolant, including plastic tubing and metal pipes. Pump 413 may be any type of fluid-motive device, including those designs useable as pump 344 (FIG. 3) in an example embodiment mobile device as well as larger or non-submergible pumps that work outside of a coolant.

Example embodiment base 400 may include several components for creating optimal coolant to supply to mobile assembly 150, including optimal cleanliness, optimal temperature, and/or optimal chemistry. For example, a heat exchanger 412 may be placed along piping 411 at any point to substantially reduce a temperature of coolant, such that coolant provided to mobile assembly 150 is lower than ambient coolant temperature and can be used for natural convective movement and/or reduce deposition potential with lower temperature. And, for example a chemical injector system 420 may be installed along piping 411 to provide desired pH, buffering, oxidation, oxygenation, boration, surfactant, clarity, salinity, replacement cations, and/or resin concentration, etc. to coolant.

As shown in FIG. 4, an example of a chemical injector system 420 may include a venturi 421 installed along piping 411. The low-pressure pinch point of venturi 421 may provide a suction for chemicals to be injected into the coolant at that point when a stop valve 422 is opened. Similarly, an injector or flow mixer may be used for venturi 421 to provide desired additions to coolant. Beyond stop valve 422 may be several different additive tanks with their own stop valves to control specific types of additives. For example, a pre-oxidizer, such as hydrogen peroxide, may be held in tank 424 by valve 423, and a dilute acid, such as a relatively weaker nitric acid, may be held in tank 426 by valve 425.

By mixing the components of tanks 424 and 426 in desired proportions and total amounts through valves 423, 425, and 422, water used as coolant may include a dilute acid that catalyzes or accelerates oxidation reactions within surfaces exposed to induced flows including the acid. Local water coolant pH in the range of 5-6 can be maintained near such surfaces to in this way, facilitating metallic deposition removal and dissolution. Metal-enriched oxides on the surfaces can further be oxidized by hydrogen peroxide in the water coolant to a soluble ion, such as oxidizing chromium-based oxides to soluble chromates, under these conditions. Radionuclides in the oxides may thus be more readily removed through filters in example embodiment systems as well as in existing coolant cleanup systems. Of course, other desired chemicals may be injected through any number of different tanks to achieve desired coolant flow chemistry.

Example embodiment base 400 may connect to a mobile assembly 150 through connection 101, providing treated coolant at a desired pressure for use in creating a flow to prevent particulate settling. Similarly, electrical power, operator instructions, and/or relocation/locomotion may be provided through connection 101 from base 400.

Figure 5:
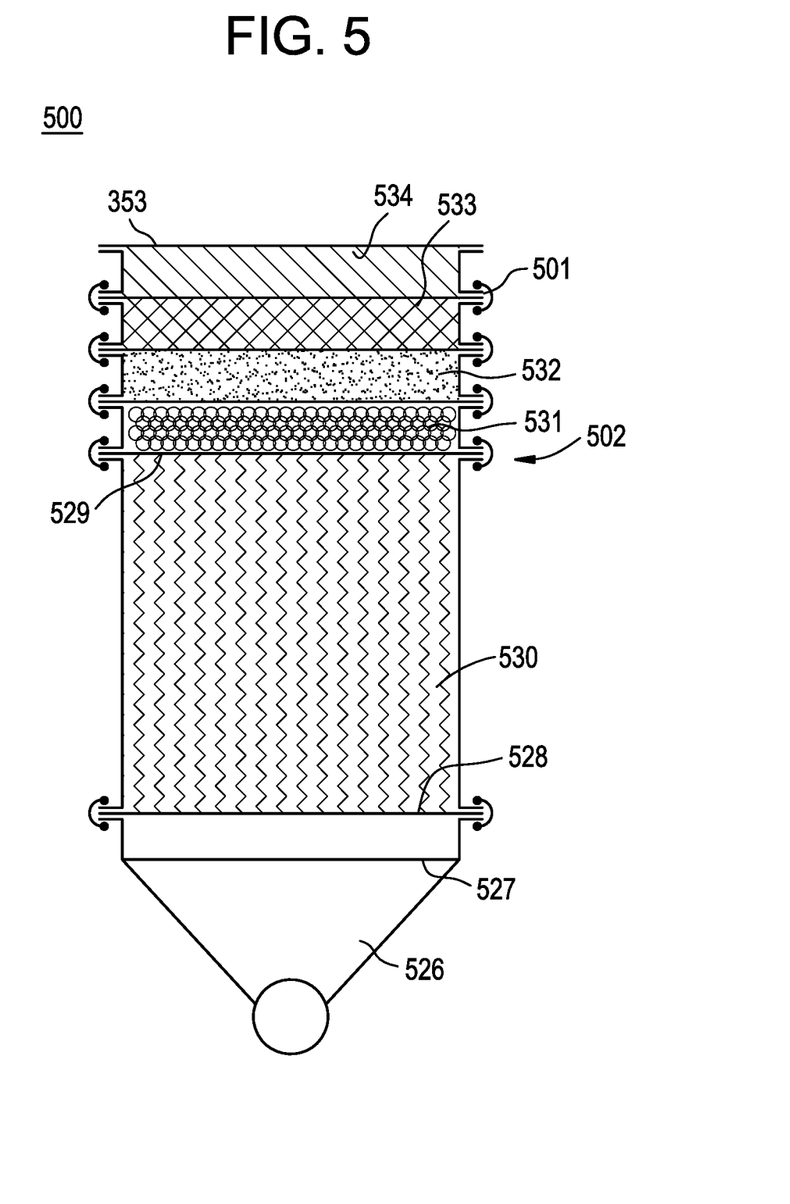
FIG. 5 is an illustration of an example embodiment filter.

FIG. 5 is an illustration of an example embodiment filter 500 useable as filter 350 in example embodiment mobile assembly 300 (FIG. 3) and/or base filter 410 (FIG. 4). As shown in FIG. 5, filter 500 may include several different layers configured to filter out unwanted coolant impurities, including radionuclides in a metallic complexes dissolved in the coolant, potentially after being removed from a surface deposition in the coolant by example embodiment systems. The layers may be discreetly staged or progressive to filter finer and finer contaminants.

For example, just below inlet 353 (FIG. 3), may be a coarse reservoir 534 with wide-pitch filters to stop macro objects like filings, paint chips, fasteners, rags, etc. that often fall into coolant spaces during maintenance. A fibrous filter 533 may be next with denser mesh or fibrous layers that catch large particulates in the coolant. Below may be a charged bed 532 of a material with an electrostatic potential, like a sand or fine gravel with varying surface ions or charged polymer chains, that attracts and holds smaller corrosion particles out of the coolant passing therethrough.

A metallic filtering bed 531 may be placed next with sintered or finely-porous corrugated metallic sheets.

Finally a resin bed 530 may be captured between two screens 529 and 528. Resin bed 530 may be a non-soluble ionized resin, like those used in conventional nuclear power coolant polishing and cleanup systems. These resins may include known products like Amberlyte, cross-linked polystyrenes, and Amberjet. Resin bed 530 may be specifically matched to capture known metallic complexes released into coolant following exposure of a contaminated surface to a flow rate of a transport velocity. Screens 529 and 528 may be sufficiently fine to prevent resin from migrating out of filter 500 while allowing clean coolant to freely pass. A backup screen 527 may be below screen 528 to prevent escape of resin 530 in the case of failure of screen 528.

Coolant may flow through each filter stage 534, 533, 532, 531, and 530 progressively, into collector 526, which may drain into an outlet, like coolant supply line 345 (FIG. 3) or piping 411 (FIG. 4), for example. In the instance of coolant supply line 345 in an example embodiment filter 300 of FIG. 3, suction from an induction pump may be sufficiently large to overcome pressure drop across each layer, driving and filtering coolant through filter 500 in sufficient volumes to create a larger, combined and clean induced flow of at least 2 m/s. In this way an induced flow may not only reduce radionuclide particulate depositions on surfaces immersed in coolant, but it may also propel a mobile assembly cleaning the same and filter coolant through the mobile assembly near an area likely to have much coolant contaminate to be intercepted through example embodiment filters.

Example embodiment filter 500 may be constructed in a manner that permits easy assembly/disassembly and minimizes additional handling of potentially radioactive components post-use. For example, each stage 534, 533, 532, 531, and 530 may be contained in a resilient filter segment with exterior flanges 501 around a perimeter of each segment end. Each flange 501 may seal against an adjacent flange between adjacent segments with a quick release 502 like a buckle or fastener that allows individual segments to be easily removed for cleaning and/or disposal at flanges 501. Flanges 501 and releases 502 may be compatible with high integrity disposal systems in shape and joining structure to permit direct disposal of used, dirty filter elements from a filter segment. Further, flanges 501 may accommodate additional shielding and/or flotation rings to be added to filter 500. For example, a dense shielding ring, such as one made out of tungsten, may be added to surround filter 500 and sit against flanges 501 to minimize exposure during handling. Similarly, a buoyant floatation ring may pass around a segment of filter 500 under a flange 501 and change buoyancy of filter 500 and example embodiment mobile assembly 300 (FIG. 3) to allow desired buoyancy and movement in coolant.

Example embodiment system 100, including a base 120 and/or mobile assembly 150 and their example embodiment components 300, 400, 500, may be configured to operate in a nuclear reactor environment. For example, all structural components in example embodiment base 400 and example embodiment mobile assembly 300 may be fabricated of materials designed to substantially maintain their physical characteristics when exposed to radiation, variable temperatures, and caustic environments encountered in nuclear reactors. Similarly, materials used in example embodiments may be of a reliable quality for failure avoidance in probabilistic risk assessment determinations and may be designed to minimize radionuclide particulate or solute entrainment or adsorption to minimize radioactive contamination and cleanup requirements post-use.

Example embodiments can be used in a variety of ways to prevent particulate deposition on surfaces immersed in a fluid. For example, in a nuclear power plant, like a BWR, ESBWR, PWR, CANDU, or ABWR, areas, like a refueling cavity or chimney, may be flooded with water coolant during operations and/or maintenance, and example embodiment systems may be installed in such areas to induce coolant water flow of about 2 meters per second against surfaces in the coolant. This may be achieved with an example embodiment mobile assembly creating the flow while immersed in the coolant. Operators may configure and direct example embodiments to specifically position flows about surfaces for deposition removal in the coolant. Example embodiments may also provide active filtering of coolant water in the direct vicinity of the flow that dislodges particulate deposition from the surfaces. Example embodiments may further provide water chemistry with deposition-removing and -dissolving pH, oxidation, replacement cations, etc. By keeping depositions from coolant off of surfaces, radionuclides may not easily remain on submerged surfaces or later become airborne when the surfaces are dried during other operations.

Example embodiments and methods thus being described, it will be appreciated by one skilled in the art that example embodiments may be varied and substituted through routine experimentation while still falling within the scope of the following claims. For example, a fluid like light water reactor coolant may be used to create a flow against surfaces in some embodiments, but other fluids, like heavy water, are equally useable in example embodiments. Although example embodiments are shown in parts of a base, mobile assembly, and filter, it is understood that these parts may be combined in a unitary submersible and/or further divided or omitted entirely depending on desired functionality. A variety of different reactor and reactor designs and radwaste management structures are compatible with example embodiments and methods simply through proper dimensioning. All such changes fall within the scope of the following claims, and such variations are not to be regarded as departure from the scope of the following claims.

What is claimed is:

1. A system for reducing contaminant deposition on a surface immersed in a fluid, the system comprising:
   a fluid source including a pump configured to draw the fluid from a cavity in which the apparatus is immersed; and
   an apparatus configured to discharge a fluid from the fluid source against a surface while immersed in the fluid, wherein the apparatus includes the pump such that the pump is immersed in the fluid.

2. The system of claim 1, wherein the fluid is a coolant water, and wherein the apparatus is further configured to discharge the coolant water to create a flow speed of the coolant water immediately on the surface of at least 2 meters per second.

3. The system of claim 1, further comprising:
   a filter within at least one of the fluid source and the apparatus, wherein the filter is configured to remove contaminants from the fluid prior to discharge from the apparatus, wherein the filter includes at least one stage of resins to remove dissolved contaminants in the fluid.

4. The system of claim 3, wherein the fluid source includes,
   a heat exchanger to cool the fluid prior to discharge from the apparatus below a temperature of the fluid in which the surface is immersed; and
   a chemical injector configured to modify a chemistry of the fluid prior to discharge from the apparatus.

5. The system of claim 1, wherein,
the fluid source includes a base having the pump, a first filter, and piping together configured to draw the fluid from the cavity in which the apparatus is immersed in the fluid,
the apparatus is a mobile assembly including an induction pump connected to the fluid source, and
the mobile assembly is moveable within the fluid to discharge the fluid on several different positions on the surface.

6. The system of claim 5, wherein,
the fluid source further includes a heat exchanger and a chemical injector,
the mobile assembly includes an intake and a second filter together configured to draw the fluid from the cavity in which the mobile assembly is immersed in the fluid, and
the mobile assembly is moveable by force from the induction pump discharging the fluid within the cavity.

7. The system of claim 6, wherein the intake and the second filter are connected to the induction pump so that the fluid is actively drawn through the intake and the second filter is entrained with fluid from the fluid source to create the discharged fluid.

8. A mobile apparatus to reduce contaminant depositions by inducing flows in a space flooded with a liquid, the mobile apparatus comprising:
a flow intake receiving the liquid from the space; and
a multi-stage filter configured to filter particulate and dissolved contaminants from the liquid; and
an outlet directing the liquid toward a surface so as to create a flow of the liquid having speed of at least 2 meters per second of the liquid contacting the surface, wherein the flow moves the mobile apparatus within the space.

9. The mobile apparatus of claim 8, further comprising:
a pump connected to the flow intake, wherein the pump is configured to create the flow while the mobile apparatus is completely immersed in the liquid in the space.

10. The mobile apparatus of claim 9, further comprising:
a liquid connection configured to receive liquid from a source, wherein the pump is an induction pump that drives the liquid from the source and the liquid from the intake together to create the flow.

11. The mobile apparatus of claim 10, wherein the liquid from the source has a different temperature, a different pH, and a different oxidizer content from the liquid from the intake.

12. The mobile apparatus of claim 8, wherein the multi-stage filter includes,
a coarse reservoir stage,
a fibrous filter stage,
a charged bed stage,
a metallic filtering bed stage, and
a resin bed stage secured between two screens.

13. The mobile apparatus of claim 12, wherein each of the stages are in separate sections of the multi-stage filter, and wherein the separate sections are removably attached to each other through flanges on ends of each of the sections.

14. The mobile apparatus of claim 12, wherein the resin bed includes a resin configured to filter metallic solutes from the liquid that are removed from depositing on the surface.

15. A method of removing contaminant depositions on open-system surfaces immersed in a water bearing contaminants, the method comprising:
flowing the water at a speed of about 2 meters per second where the water meets the surface, wherein the water includes an oxidizer and a weak acid when flowed at the surface, wherein the flowing is produced by a mobile assembly completely submerged in the water, wherein the mobile assembly includes an induction pump causing the flowing the water; and
filtering the water for contaminants dissolved in the water as a result of the flowing.

* * * * *